US011321976B2

(12) United States Patent
Wilgar et al.

(10) Patent No.: US 11,321,976 B2
(45) Date of Patent: May 3, 2022

(54) ADAPTIVELY CONFIGURING A TIRE MOUNTED SENSOR (TMS) WITH A VEHICLE-PROVIDED PARAMETER

(71) Applicant: SCHRADER ELECTRONICS LIMITED, Antrim (GB)

(72) Inventors: Jonathan Wilgar, Carrickfergus (GB); Alan C. Parks, Waringstown (GB); William D. Stewart, Antrim (GB)

(73) Assignee: SCHRADER ELECTRONICS LIMITED, Antrim (GB)

( * ) Notice: Subject to any disclaimer, the term of this patent is extended or adjusted under 35 U.S.C. 154(b) by 264 days.

(21) Appl. No.: 16/675,598

(22) Filed: Nov. 6, 2019

(65) Prior Publication Data

US 2021/0134082 A1 May 6, 2021

(51) Int. Cl.
*G07C 5/08* (2006.01)
*G01P 3/44* (2006.01)
*G07C 5/00* (2006.01)
*G01P 15/08* (2006.01)
*G01P 15/18* (2013.01)

(52) U.S. Cl.
CPC ............... *G07C 5/085* (2013.01); *G01P 3/44* (2013.01); *G01P 15/08* (2013.01); *G01P 15/18* (2013.01); *G07C 5/008* (2013.01)

(58) Field of Classification Search
CPC . G07C 5/085; G01P 3/44; G01P 15/08; G01P 15/18
See application file for complete search history.

(56) References Cited

U.S. PATENT DOCUMENTS

2020/0317203 A1  10/2020  Suzuki et al.
2021/0046789 A1* 2/2021  Engl .................. B60C 23/0471

FOREIGN PATENT DOCUMENTS

| EP | 3208638 A4 | 8/2017 |
| WO | 2019049808 A1 | 3/2019 |
| WO | 2019074027 A1 | 4/2019 |
| WO | 2019124482 A1 | 6/2019 |

OTHER PUBLICATIONS

International Search Report and Written Opinion, PCT/EP2020/080465, dated Nov. 27, 2020, 12 pages.

* cited by examiner

*Primary Examiner* — Manuel A Rivera Vargas
(74) *Attorney, Agent, or Firm* — Mark H. Williams

(57) ABSTRACT

Methods and systems for adaptively configuring a tire mounted sensor (TMS) with vehicle-provided parameters are disclosed. A vehicle control unit obtains data from vehicle sensors and other sources and transmits configuration parameters to the TMS. The TMS signal processing components are configured according to the configuration parameter to minimize the number of tire rotations needed to generate an accelerometric profile and extract a tire feature. The extracted feature is transmitted back to the vehicle control unit with the aim of minimizing the computational resources and battery consumption of the TMS.

18 Claims, 11 Drawing Sheets

ADAPTIVELY CONFIGURING A TIRE MOUNTED SENSOR (TMS) WITH A VEHICLE-PROVIDED PARAMETER

BACKGROUND

Tire mounted sensors (TMSs), unlike valve-mounted sensors, are mounted on an internal surface of the tire. Accordingly, a battery in a TMS is not readily replaceable and therefore it is desirable to conserve the energy consumed by a TMS. However, components of a TMS, such as a frequency analyzer or a digital signal processor, consume considerable power when performing computations. A TMS may even process and transmit data when the vehicle operating conditions are not conducive to acquiring reliable data from the TMS. This unnecessary expenditure of computational resources needlessly consumes energy. Moreover, a TMS that attempts to collect and process accelerometric data during unfavorable conditions, or without any knowledge of vehicle operating conditions, may expend more computational resources than would have otherwise been needed. Accordingly, there is a need to optimize the performance and minimize the energy consumption of remote, energy-restricted sensors such as TMSs, valve mounted sensors, and rim mounted sensors.

SUMMARY

An embodiment in accordance with the present disclosure is directed to a method of a tire mounted sensor (TMS) comprising an accelerometer, a data processing unit, and a transceiver, the method comprising receiving, by the transceiver, one or more parameters from a vehicle control unit, configuring, in dependence upon the one or more parameters, the data processing unit, processing, by the data processing unit, signals from the accelerometer, extracting, from the signals, by the data processing unit, tire feature data, and transmitting, by the transceiver, the tire feature data to the vehicle control unit.

Another embodiment in accordance with the present disclosure is directed to a tire mounted sensor (TMS) comprising an accelerometric device responsive to radial, tangential, and lateral acceleration forces of a tire, a data processing unit configurable by at least one parameter supplied by a vehicle control unit, wherein the data processing unit processes signals from the accelerometer and extracts, from the signals, tire feature data, and a transceiver configured to receive the at least one parameter from the vehicle control unit and transmit, to the vehicle control unit, the extracted tire feature data.

In these embodiments, the tire feature data may include at least one of a radial acceleration profile, peak radial displacement, and a contact patch. Receiving, by the transceiver, one or more parameters from a vehicle control unit may include receiving a wheel speed, and configuring, in dependence upon the one or more parameters, the data processing unit may include configuring, in dependence upon the wheel speed or another vehicle-provided parameter, the accelerometer, the sampling rate of the accelerometer, signal capture parameters, window function parameters of a road strike waveform, a filter frequency band, and/or Fast Fourier Transform (FFT)/Goertzel parameters. In these embodiments, extracting, from the signals, by the data processing unit, the tire feature data may include calculating a contact patch length based on a rotational period of the tire.

In these embodiments, processing, by the data processing unit, signals from the accelerometer may include isolating a road strike waveform by applying a windowing function. Receiving, by the transceiver, one or more parameters from a vehicle control unit may include receiving at least one of wheel speed, radial force offset, yaw rate, vehicle inclination, and wiper activity. The transceiver may be a Bluetooth Low Energy transceiver.

Yet another embodiment in accordance with the present disclosure is directed to a method for adaptively configuring a TMS, the method comprising receiving data including at least one of a vehicular sensor reading and a tire characteristic from a database, determining, in dependence upon the received data, at least one configuration parameter for the TMS, transmitting the at least one configuration parameter to the TMS, and receiving, in response, tire feature data from the TMS.

Still another embodiment in accordance with the present disclosure is directed to a vehicle control unit for adaptively configuring a TMS using a vehicle-provided parameter, comprising a controller configured to receive data including at least one of a vehicular sensor reading and a tire characteristic from a database and to determine, in dependence upon the received data, at least one configuration parameter for the TMS, and a transceiver configured to transmit the at least one configuration parameter to the TMS and to receive tire feature data from the TMS.

In these embodiments, a load on the tire may be calculated in dependence upon the tire feature data. In these embodiments, prior to transmitting the at least one configuration parameter to the TMS, the vehicle control unit may determine that the vehicle is in a steady state, and may also transmit a wake-up signal to the TMS. Receiving data including at least one of a vehicular sensor reading and a tire characteristic from a database may include receiving wheel speed sensor reading from a wheel speed sensor, and determining, in dependence upon the received data, at least one configuration parameter for the TMS may include determining at least one of a wheel speed and a rotational period of the tire. Furthermore, receiving data including at least one of a vehicular sensor reading and a tire characteristic from a database may include receiving a tire characteristic from a cloud database.

In these embodiments, the at least one configuration parameter includes at least one of wheel speed, radial force offset, yaw rate, and vehicle inclination. The tire feature data may be at least one of a radial acceleration profile, peak radial displacement, and a contact patch length. The transceiver used for communicating with the TMS may be a Bluetooth Low Energy transceiver.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
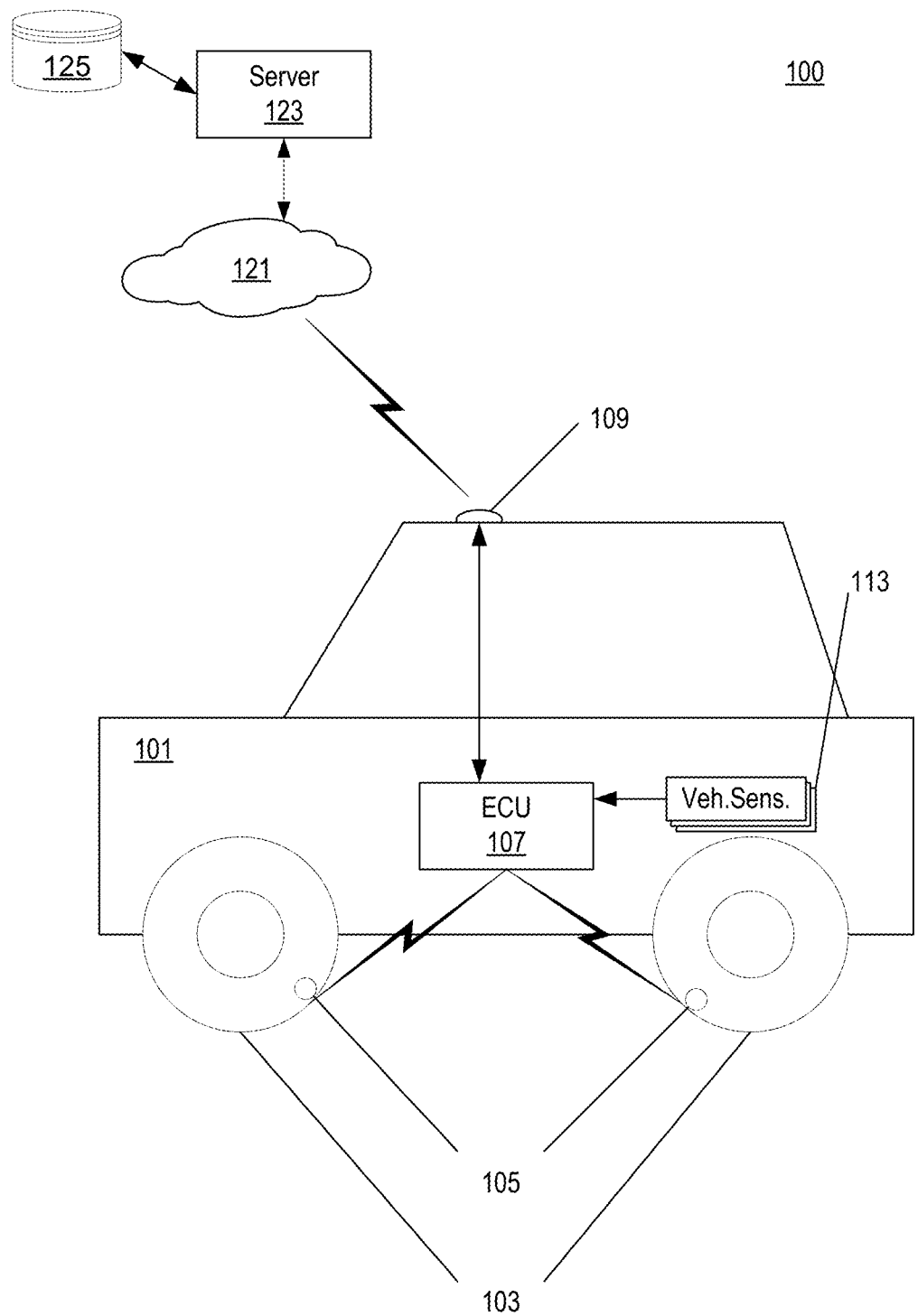
FIG. 1 sets forth a block diagram of a system for adaptively configuring a tire mounted sensor (TMS) with vehicle-provided parameters according to embodiments of the present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Embodiments described in the present disclosure utilize improvements in two-way communication with the tire mounted sensor (TMS) to enable system logic on the vehicle to determine how the TMS should process the signal from the accelerometer. To determine useful features from the accelerometric signals from a tire mounted sensor, it may be necessary to determine the rotation period and the status of the vehicle. Two-way communication utilizing, e.g. Bluetooth Low Energy, allows the possibility of transmitting the appropriate information to the sensor on wakeup, and quickly obtaining a result with minimal rotation cycles rather than having the sensor establish the rotations and perform these operations independently, thus reducing consumption life and providing a quicker response time. Depending on the vehicle condition and speed, the sensor can also be placed into a mode where certain aspects of the signal are interrogated to determine parameters.

Exemplary methods, apparatus, and products for adaptively configuring a tire mounted sensor with vehicle-provided parameters in accordance with the present disclosure are described with reference to the accompanying drawings, beginning with FIG. 1. FIG. 1 sets forth a diagram of a system (100) for adaptively configuring a tire mounted sensor with vehicle-provided parameters according to embodiments of the present disclosure. The system of FIG. 1 includes a vehicle (101) equipped with tires (103) that include tire mounted sensors (TMSs) (105). While the embodiment of FIG. 1 shows two tires each equipped with a TMS (105), it will be understood that as few as one, and as many as all, of the tires (103) of the vehicle (101) may include a TMS (105). The vehicle of FIG. 1 further includes a vehicle control unit (107), commonly referred to as the vehicle's "computer," which may be an electronic control unit (ECU) as shown in FIG. 1. Each TMS (105) is equipped with a wireless transceiver for bidirectional wireless communication with the ECU (107), as will be described in more detail below. The ECU is similarly equipped with a wireless transceiver for bidirectional wireless communication with the each TMS (105), as will be described in more detail below. The bidirectional wireless communication may be realized by low power communication technology such as Bluetooth Low Energy or other low power bidirectional communication technology that is intended to conserve energy consumed.

The ECU (107) may be a central control unit or may refer collectively to one or more vehicle subsystems, such as an Engine Control Module (ECM), a Powertrain Control Module (PCM), a Transmission Control Module (TCM), a Brake Control Module (BCM), a Central Timing Module (CTM), a General Electronic Module (GEM), or a Suspension Control Module (SCM). In an embodiment according to the present disclosure, the ECU (110) includes a BCM that includes an Antilock Braking System (ABS) and an Electronic Stability Program (ESP). Each vehicle system may include sensors (113) used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors (113) may be provided to the ECU (107), which may provide parameters based on these readings to the TMS (105).

The vehicle (101) may further include a transceiver (109) communicatively coupled to the ECU (107) for cellular terrestrial communication, satellite communication, or both. The transceiver (109) may be used to communicatively couple the ECU (107) to a cloud (121) for obtaining tire specification data, characteristic data, and parameters specific to the tire (103). For example, a server (123) on the cloud (121) may provide access to a database (125) of tire brands and models and their specifications and characteristics. For example, tire specifications may include tire type (e.g., passenger), width, aspect ratio, diameter, circumference, treadwear grade, traction grade, temperature grade, maximum load limit, load index, inflation limits, optimal inflation pressure, and other specifications as will be recognized by those of skill in the art. Tire characteristics may include reference models for radial force acceleration profiles, tangential force acceleration profiles, lateral force acceleration profiles, contact patch lengths, or peak radial displacements corresponding to various speeds, road terrains, tire pressures, tire temperatures, environmental temperatures, and weather conditions. Furthermore, configuration parameters for the TMS (105) can be accessed from the database (125) or other locations on the cloud (121) and transmitted to the TMS (105) from the ECU (107). For example, new feature developments may require alternate processing of the accelerometric signal. The configuration parameters selected could also be changed based on GPS location or weather information, etc.

The TMS (105) may be programmed with tire identification data (e.g., wirelessly via a handheld tool). The tire identification data may be retrieved from the TMS (105) by the ECU (107), which accesses, based on the tire identification data, records from a database located internally (not shown) or on the cloud (121). From the database, parameters of the tire relevant to the application are received in the ECU (107) and then used to configure the TMS (105) through direct transmission of the parameters or some subset/function of the parameters.

The arrangement of devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, and others as will occur to those of skill in the art. Various embodiments of the present disclosure may be implemented on a variety of hardware platforms in addition to those illustrated in FIG. 1.

Figure 2:
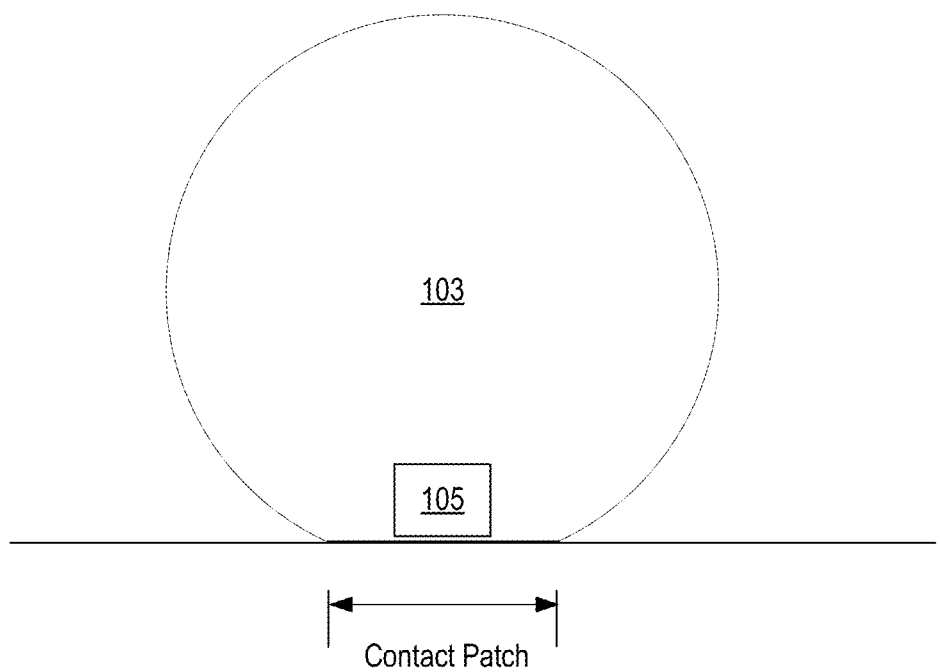
FIG. 2 illustrates a block diagram of a tire having a TMS that is adaptively configured based on a vehicle-provided parameter.

FIG. 2 illustrates a block diagram of a tire having a TMS that is adaptively configured based on a vehicle-provided parameter. Typically, the TMS (105) is mounted on, or otherwise coupled to, an internal surface of the tire (103), especially on the inside of the tread rather than the side wall. As the tire (103) rotates, the portion that engages with the road surface at any given time is flattened. The flattened portion is known as the tire footprint or, interchangeably, contact patch. One or more features of the tire (103), in particular the length of the contact patch (typically measured in the direction of travel of the vehicle), may be used, for example, as an indication of the load on the tire (103). Electrical signals produced by the TMS (105) can be used to measure the contact patch, in particular its length, as will be described in more detail below. It will be understood that one or more of the tires (103) of the vehicle (101) may each include a TMS (105) for providing one or more target signals in respect of which pulse width measuring is performed.

Figure 3:
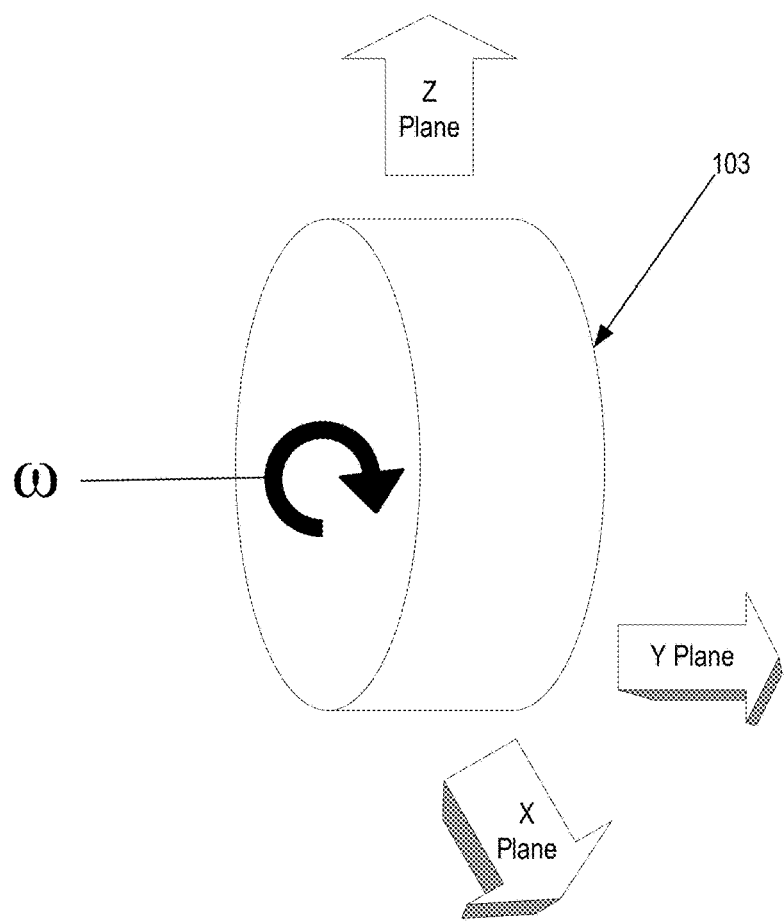
FIG. 3 illustrates a reference diagram of a tire in accordance with the present disclosure.

FIG. 3 illustrates reference diagram of a tire (103) in accordance with the present disclosure. As used in this disclosure, the z-axis of the tire (103) is the direction of radial force during rotation, the y-axis of the tire is the direction of lateral force during rotation, and the x-axis of the tire (103) is the direction of tangential force during rotation. The angular speed of rotation, in radians, is represented by w, and is also referred to herein as wheel speed.

Figure 4:
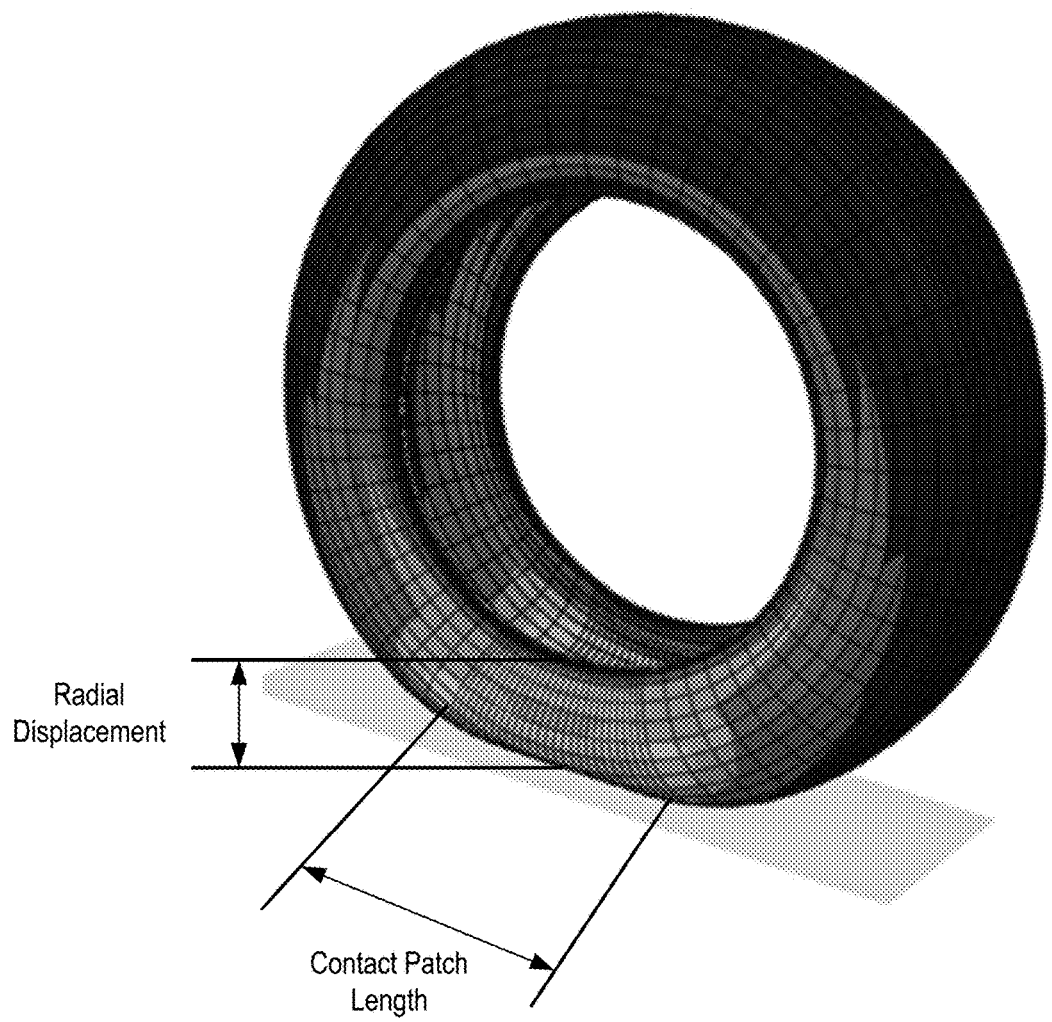
FIG. 4 illustrates tire features that may be measured using a TMS in accordance with the present disclosure.
Figure 5:
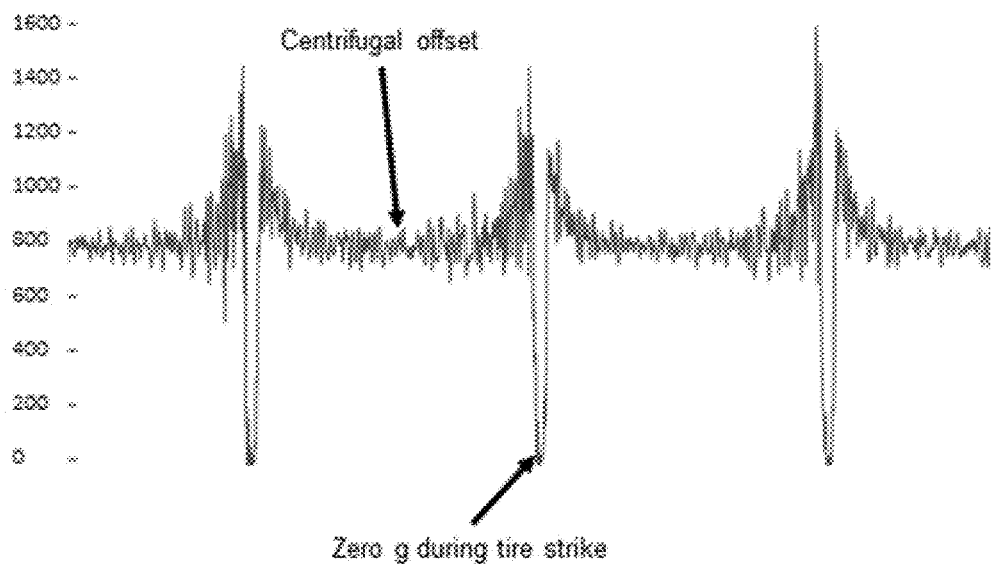
FIG. 5 illustrates an example raw accelerometric waveform.
Figure 6:
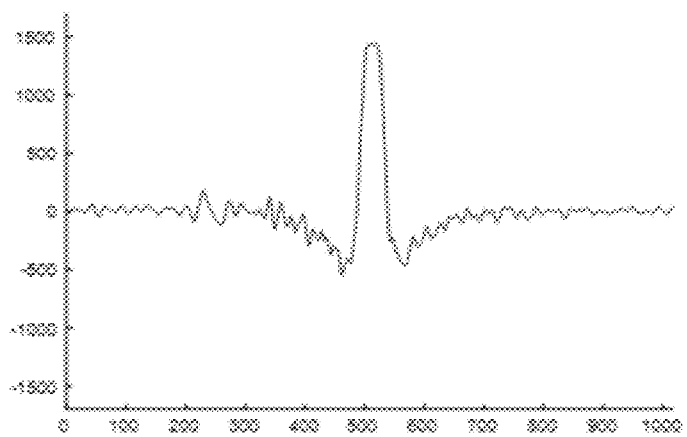
FIG. 6 illustrates an example processed accelerometric waveform.

FIG. 4 illustrates tire features that may be measured using a TMS in accordance with the present disclosure. Two tire features that are indicative of tire load are contact patch length and radial displacement, as illustrated in FIG. 4. Radial acceleration is measured using the TMS (103), which may be equipped with an accelerometer, an acceleration sensor, an accelerometric device, a shock sensor, a force sensor, a microelectromechanical systems (MEMS) sensor, or other devices that are similarly responsive to acceleration magnitude and/or to changes in acceleration. For example, an accelerometer senses acceleration in the radial plane (z-plane) (see FIG. 3). As illustrated in FIG. 5, the characteristic of the accelerometric waveform exhibits a centrifugal offset and region where the magnitude momentarily drops to zero during the time when the zone where the sensor is mounted is at tire/ground contact position. This measurement is repeated for rotations of the tire. The radial acceleration signal is then conditioned to make processing easier by isolating each strike in the acceleration profile, low-pass filtering the waveform, inverting the waveform, and normalizing the waveform for speed, the result of which is shown in FIG. 6.

Returning to FIG. 4, contact patch length (CPL) and peak radial displacement (PRD) are two tire features useful in determining the tire load. Both CPL and PRD are influenced by tire load and pressure, and, accordingly, tires may be characterized by comparing the magnitude of CPL or PRD with varying pressure and load. Characteristic equations may be stored, for example, in the TMS (105) of FIG. 1 or in the vehicle control unit (107) of FIG. 1. CPL may be estimated by measuring the time at which the radial acceleration is returning to and is at zero g. This time is then expressed as a quotient/ratio of the time for a complete rotation, and the CPL is derived from its ratio of the known tire circumference. In order to determine the PRD, the radial accelerometric signal is integrated twice with respect to time. For load estimation, either of these two methods can be used independently.

Figure 7:
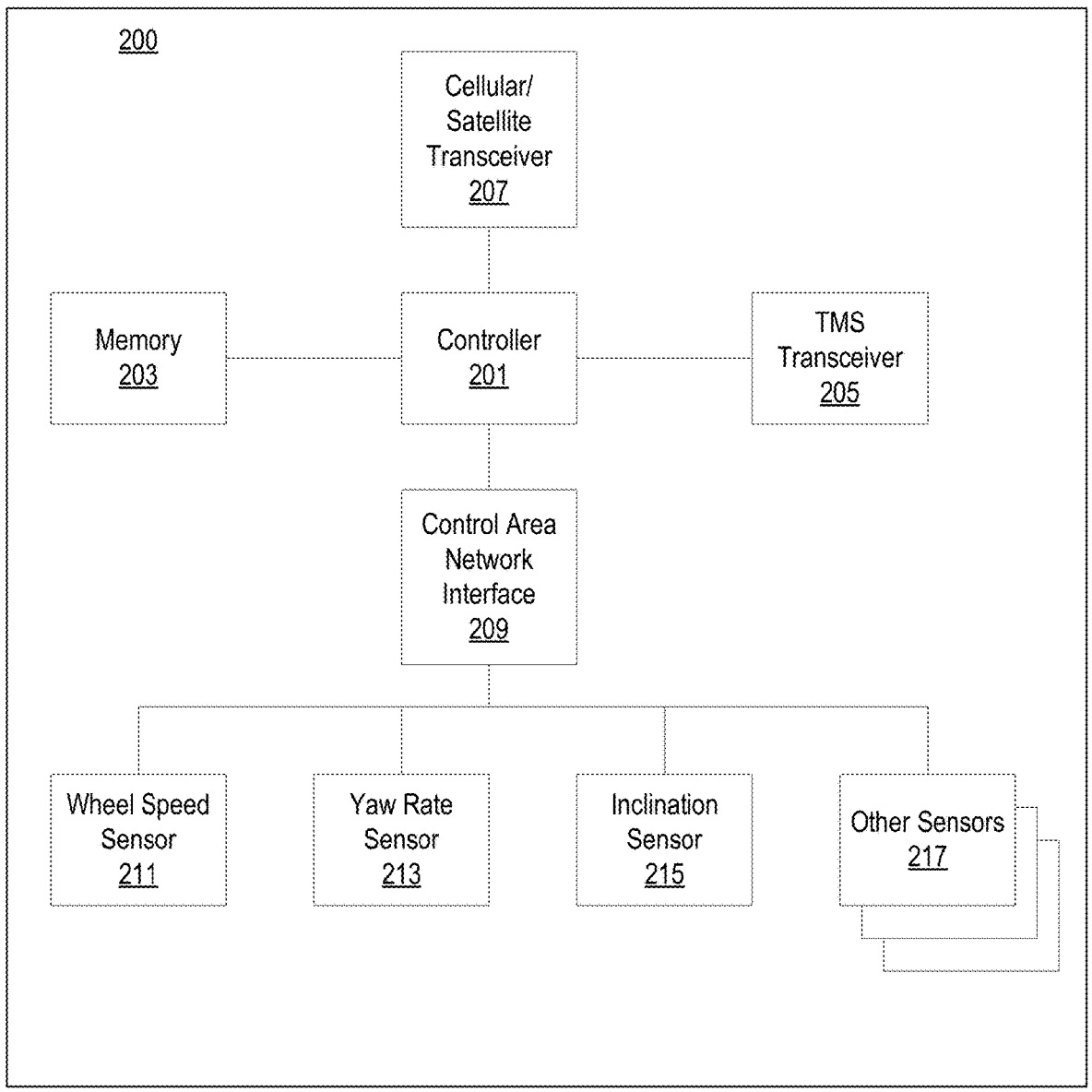
FIG. 7 illustrates a block diagram of an exemplary vehicle control system in accordance with the present disclosure.

For further explanation, FIG. 7 sets forth a diagram of an exemplary vehicle control system (VCS) (200) for configuring a tire mounted sensor with vehicle-provided parameters according to embodiments of the present disclosure. The VCS (200) includes a controller (201) coupled to a memory (203). The controller (201) is configured to obtain sensor readings related to vehicle operating conditions, as well as data from sources external to the vehicle, and provide configuration parameters to a TMS, such as TMS (300) (see FIG. 8). The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the TMS, may be stored in the memory (203). The memory (203) may be a non-volatile memory such as flash memory. The memory (203) may include computer program instructions that when executed by the processor cause the processor to: receiving data including at least one of a vehicular sensor reading and a tire characteristic from a database; determining, in dependence upon the received data, at least one configuration parameter for the TMS; transmitting the at least one configuration parameter to the TMS; and receiving, in response, tire feature data from the TMS.

For example, the VCS (200) may obtain vehicle operating condition data such as sensor readings from sensors on-board the vehicle. The VCS (200) may also obtain tire specification data for a tire equipped on the vehicle, such as the tire (103) of FIG. 1. The VCS (200) may receive the various readings and data and provide one or more configuration parameters to the TMS based on the readings and data.

For bidirectional wireless communication with a TMS, the VCS (200) includes a TMS transceiver (205) coupled to the controller (201). In one embodiment, the TMS transceiver (205) is a Bluetooth Low Energy transmitter-receiver. In other embodiments, the TMS transceiver (205) may be other types of low power bidirectional communication technology that is intended to conserve energy consumed in the TMS. The VCS (200) transmits configuration parameters and configuration instructions to the TMS via the transceiver (205).

The VCS (200) may further include a transceiver (207) for cellular terrestrial communication, satellite communication, or both. The transceiver (207) may be used to communicatively couple the VCS (200) to an external network (not shown) for obtaining tire specification data, characteristic data, and configuration parameters specific to a tire make and model.

The VCS (200) may further comprise a controller area network (CAN) interface (209) for communicatively coupling vehicle sensors and devices to the controller (201). Of particular relevance to the present disclosure, the CAN interface (209) couples a wheel speed sensor (211), a yaw rate sensor (213), an inclination sensor (215), and other sensors (217), to the controller (201). The wheel speed sensor (211) measures the rotational angular speed of the wheel, e.g., in radians per second. The yaw rate sensor (213) may be used to measure the yaw-induced acceleration of the vehicle, for example, when the vehicle is maneuvering a curve, which will influence the magnitude of loading on each tire. The yaw rate sensor (213) may also provide information on the shear forces on the tire where it contacts the road. The inclination sensor (215) may detect longitudinal and/or transverse inclination of the vehicle. The wheel speed sensor (211), the yaw rate sensor (213), and the inclination sensor (215) transmit respective readings to the controller (201), which may transmit configuration parameters derived from these readings to the TMS via the TMS transceiver (205).

The controller (201) is configured to communicate to the TMS when and how to process accelerometric signals. For example, the controller (201) may wait for the vehicle to achieve a steady operational state based on readings received from the wheel speed sensor (211), the yaw rate sensor (213), and the inclination sensor (215), and the other sensors (217), before requesting or initiating data readings from the TMS. A steady operational state may be determined based on defined operating ranges for tire pressure and temperature, vehicle speed and acceleration, steering angle, and road surface. For example, an ideal steady operational state may be based on detecting a constant wheel speed and/or when the acceleration, yaw, and inclination are near zero or below a predetermined threshold. By waiting for the vehicle to achieve a steady operational state, it is not necessary to operate the TMS while the TMS is processing non-stabilized data. Retrieving stabilized data from the TMS thus results in a more accurate load calculation. In an embodiment, the controller (201) transmits a wake-up signal to the TMS via the communication link between the TMS transceiver (205) and the TMS. Subsequent to or concurrent with the wake-up signal, the controller (201) may transmit a configuration parameter. In an embodiment, the configuration parameter is based on the wheel speed reading from the wheel speed sensor (211). For example, the configuration parameter may be the angular rotational speed of the wheel, or may be the rotational period of the wheel. Other configuration parameters may include parameters based on sensor readings for yaw rate or inclination, or based on operational conditions such as, e.g., whether the windshield wipers are active (thus indicating slick road conditions).

The controller (201) is further configured to receive tire feature data from the TMS, for example CPL or PRD described above. Based on the tire feature data, the processor is configured to calculate a tire load or compensate a TMS derived load for vehicle dynamics/conditions. In some embodiments, the controller (201) may be configured to calculate tread depth based on data retrieved from the TMS while driving. For example, the controller (201) may send an instruction to the TMS to process a road strike and examine, for example, the entry tail of the radial acceleration. The analyzed data received from the TMS can then be used as part of a tire wear estimation algorithm.

Figure 8:
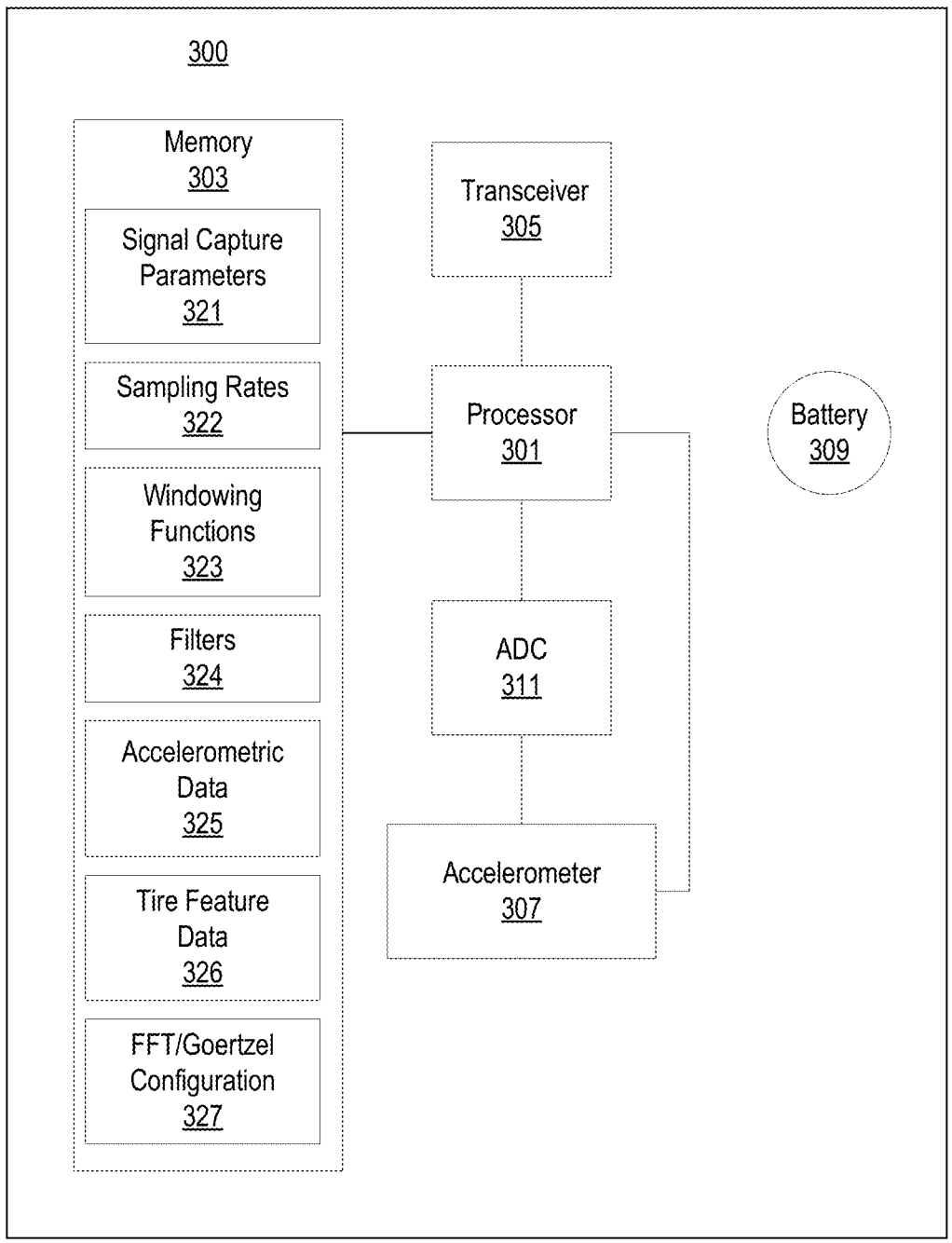
FIG. 8 illustrates a block diagram of an exemplary TMS in accordance with the present disclosure.

For further explanation, FIG. 8 sets forth a diagram of an exemplary TMS (300) for configuring a tire mounted sensor with vehicle-provided parameters according to embodiments of the present disclosure. The TMS (300) includes a processor (301) configured to receive configuration parameters from the VCS (200) (see FIG. 7) via a transceiver (305), configure the TMS in dependence upon the parameters, process accelerometric data, extract tire features from the processed data, and transmit the extracted features back to the VCS (201). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TMS (300) of FIG. 8 also includes a memory (303) coupled to the processor (301). The memory may store signal capture configuration parameters (321) and other data received from the VCS (301). The memory (303) may store a sampling rates table (322) of sampling rates each corresponding to a specific parameter value, e.g., a wheel speed or rotational period of the tire. The memory (303) may also store a windowing function table (323) of windowing functions each corresponding a specific parameter value, e.g., a wheel speed or rotational period of the tire. The memory (303) may also store a filter table (324) filter frequency bands, each corresponding to a specific parameter value, e.g., a wheel speed or rotational period of the tire. The memory (303) may also store accelerometric data (325), including a raw digital signal sampled from the accelerometer (307) by the ADC (311) and a processed accelerometric waveform processed by the processor (301). The memory (303) may also store tire feature data (326), such as an CPL or PRD extracted by the processor (301). The memory (303) may also store FFT or Goertzel algorithm configurations (327)

For bidirectional wireless communication with the VCS (200), the TMS (300) of FIG. 8 includes a transceiver (305)

coupled to the processor (301). In one embodiment, the transceiver (305) is a Bluetooth Low Energy transmitter-receiver. In other embodiments, the transceiver (305) may be other types of low energy bidirectional communication technology that is intended to conserve energy consumed in the TMS (300). The TMS (300) transmits extracted tire feature data, such as acceleration profiles, PRD, and CPL, to the VCS (200) via the transceiver (305).

The accelerometer (307) of FIG. 8 may also be an acceleration sensor, an accelerometric device, a shock sensor, a force sensor, a microelectromechanical systems (MEMS) sensor, or other device that is similarly responsive to acceleration magnitude and/or to changes in acceleration. For example, an accelerometer senses acceleration in the radial plane (z-plane) and outputs an electric pulse signal responsive to sensed acceleration. In an embodiment, the accelerometer (307) is configurable with an accelerometer range, a wheel speed parameter, or other vehicle parameter provided by the VCS (200). For example, g-offset can be determined via wheel speed sensor or another vehicle parameter and used to capture and process signal faster. Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer.

The TMS (300) of FIG. 8 also includes an analog to digital converter (ADC) (311) that receives the electric pulse signals from the accelerometer (307) and samples them according to a sampling rate. The ADC (311) converts the raw analog signals received from the accelerometer (307) into a raw digital signal that is suitable for digital signal processing. The sample rate of the ADC (311) may be configured via wheel speed from the wheel speed sensor or another vehicle-provided parameter from a vehicle sensor.

The TMS (300) of FIG. 8 also includes a battery (309) connected to a power bus (not shown) to power the transceiver (305), the processor (301), the ADC (311), the accelerometer (307), and the memory (303). By waiting until a steady state indication or wake-up signal is received from the VCS (200) at the TMS (300), and by configuring the TMS with parameters from the VCS (300) to optimize processing of accelerometric data to reduce the number of road strikes needed to extract a tire feature, battery charge in the battery (309) is conserved.

In an embodiment, the rotational period of the tire is used in the signal processing of the accelerometry by the processor (301). A windowing function after strike detection typically takes greater than 5 rotations to establish a suitable window to reduce harmonics after, e.g., a Fast Fourier Transform (FFT) or the Goertzel algorithm. Filter banks used in the signal processing should also be applied according to the speed of rotation. Utilizing the time period and other information such as flags for certain features, the windowing function can be selected and the frequency bands specified. Thus, the strike and the information can be processed more quickly and using less computational resources.

Figure 9:
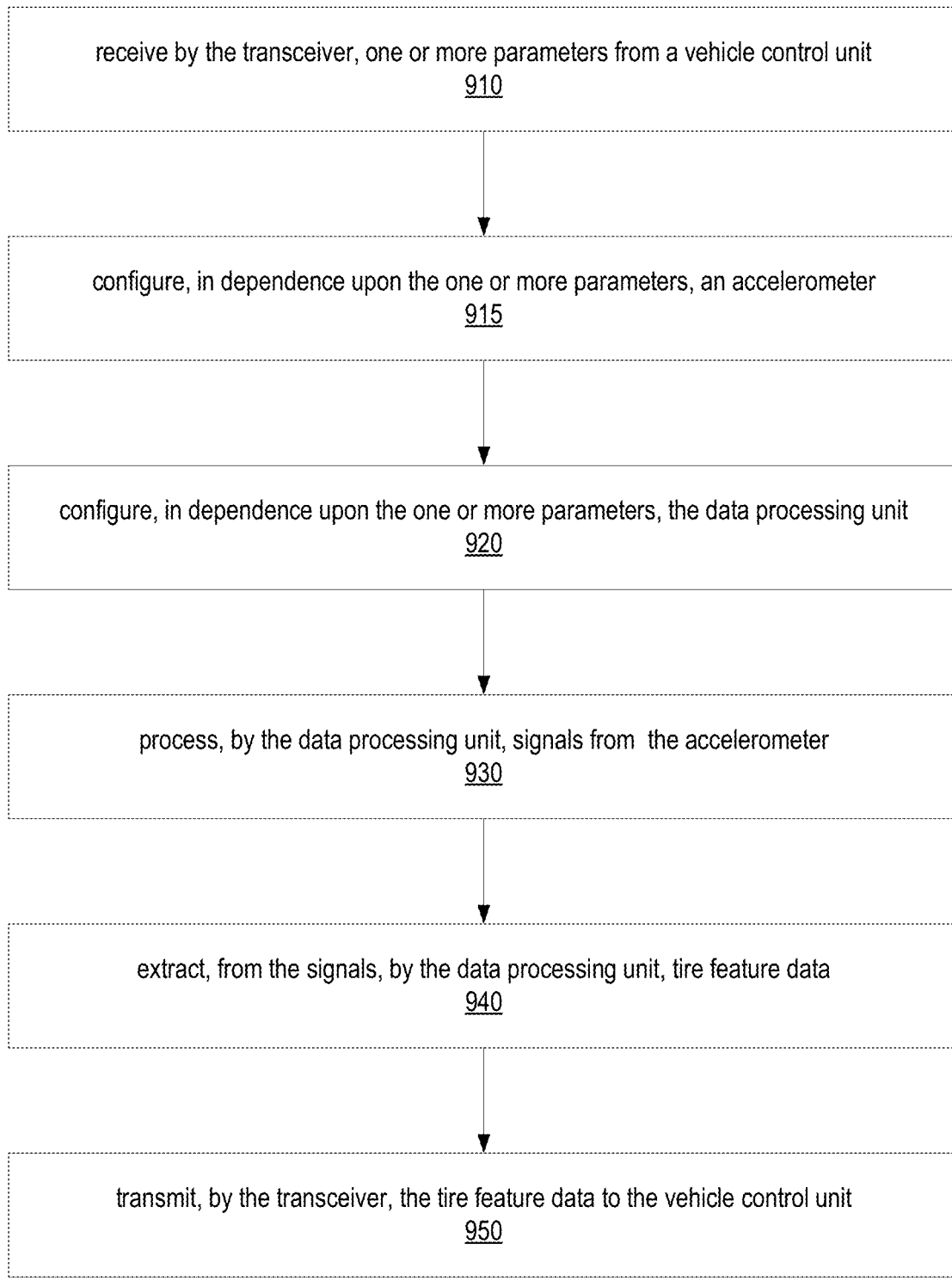
FIG. 9 is a flowchart to illustrate an implementation of a method for adaptively configuring a TMS with vehicle provided parameters in accordance with the present disclosure.

For further explanation, FIG. 9 sets forth a flow chart illustrating an exemplary method for configuring a tire mounted sensor with vehicle-provided parameters according to embodiments of the present disclosure that includes receiving (910), by the transceiver, one or more parameters from a vehicle control unit. Receiving (910), by the transceiver, one or more parameters from a vehicle control unit may be carried out by the TMS (300) receiving, via the transceiver (305), a vehicle operating condition parameter such as wheel speed, yaw rate, inclination, g-offset, and so on from the VCS (200). Receiving (910), by the transceiver, one or more parameters from a vehicle control unit may be carried out by the TMS (300) receiving, via the transceiver (305), a tire characteristic from the VCS (200).

The exemplary method of FIG. 9 also includes configuring (915), in dependence upon the one or more parameters, an accelerometer. Configuring (915), in dependence upon the one or more parameters, an accelerometer may be carried out by the processor (301) configuring one or more of the acceleration range and gain of the accelerometer (307), in dependence upon the parameter received from the VCS (200). For example, when the parameter received from the VCS (200) is a wheel speed parameter from a wheel speed sensor, the processor (301) may configure the accelerometer (307) to have a range of ±150 g at a low speed, ±250 g at a medium speed, and ±500 g at a high speed (see also FIG. 11).

The exemplary method of FIG. 9 also includes configuring (920), in dependence upon the one or more parameters, the data processing unit. Configuring (920), in dependence upon the one or more parameters, the data processing unit may be carried out by the processor (301) configuring one or more of a sampling rate, a windowing function, and a filter bank for processing signals received from the accelerometer (307), in dependence upon the parameter received from the VCS (200).

The exemplary method of FIG. 9 also includes processing (930), by the data processing unit, signals from an accelerometer. Processing (930), by the data processing unit, signals from an accelerometer may be carried out by the processor (301) converting electrical signals from the accelerometer (307) to a digital signal by sampling the analog signals to produce a raw accelerometric waveform profile, applying a windowing function to isolate individual road strikes, inverting and zeroing the signal, filtering the windowed waveform to remove noise, and performing a Fourier transform on the waveform to convert the waveform to a frequency domain.

The exemplary method of FIG. 9 also includes extracting (940), from the signals, by the data processing unit, tire feature data. Extracting (940), from the signals, by the data processing unit, tire feature data may be carried out by analyzing an accelerometric profile waveform in the frequency domain for a plurality of road strike intervals. Extracting (940), from the signals, by the data processing unit, tire feature data may also be carried out by calculating a CPL and/or a PRD from the accelerometric profile waveform in the frequency domain.

The exemplary method of FIG. 9 also includes transmitting (950), by the transceiver, the tire feature data to the vehicle control unit. Transmitting (950), by the transceiver, the tire feature data to the vehicle control unit may be carried out by the transceiver (305) transmitting at least one of a radial acceleration profile, a tangential acceleration profile, a lateral acceleration profile, the PRD, and the CPL to the VCS (200).

Figure 10:
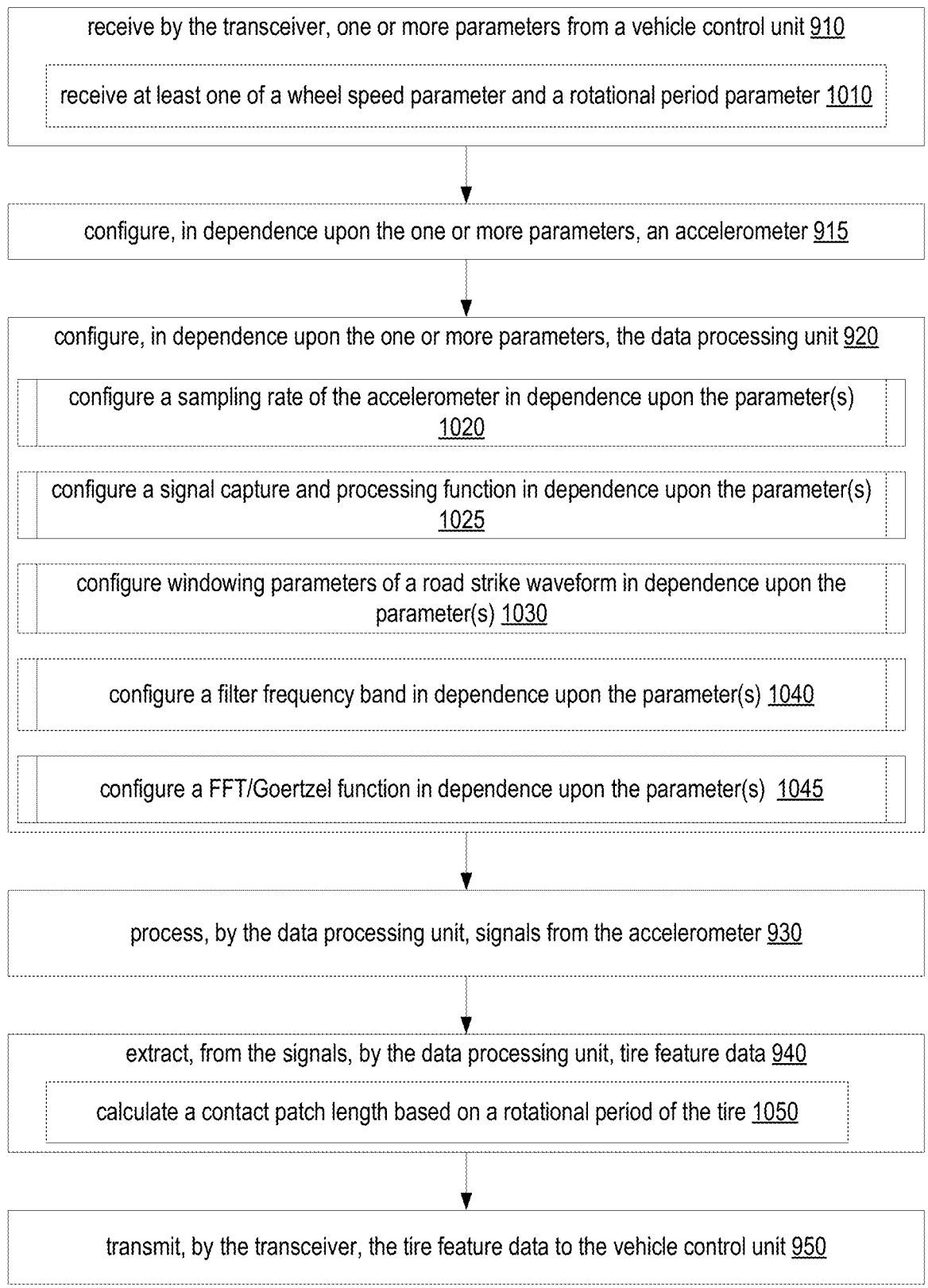
FIG. 10 is a flowchart to illustrate another implementation of a method for adaptively configuring a TMS with vehicle provided parameters in accordance with the present disclosure.

For further explanation, FIG. 10 sets forth a flow chart illustrating another exemplary method for configuring a tire mounted sensor with vehicle-provided parameters according to embodiments of the present disclosure. Like the exemplary method of FIG. 9, the exemplary method of FIG. 10 also includes receiving (910), by the transceiver, one or more parameters from a vehicle control unit, configuring (915), in dependence upon the one or more parameters, an accelerometer, configuring (920), in dependence upon the one or more parameters, the data processing unit, processing (930), by the data processing unit, signals from an accelerometer, extracting (940), from the signals, by the data processing unit, tire feature data, and transmitting (950), by the transceiver, the tire feature data to the vehicle control unit.

Figure 11:
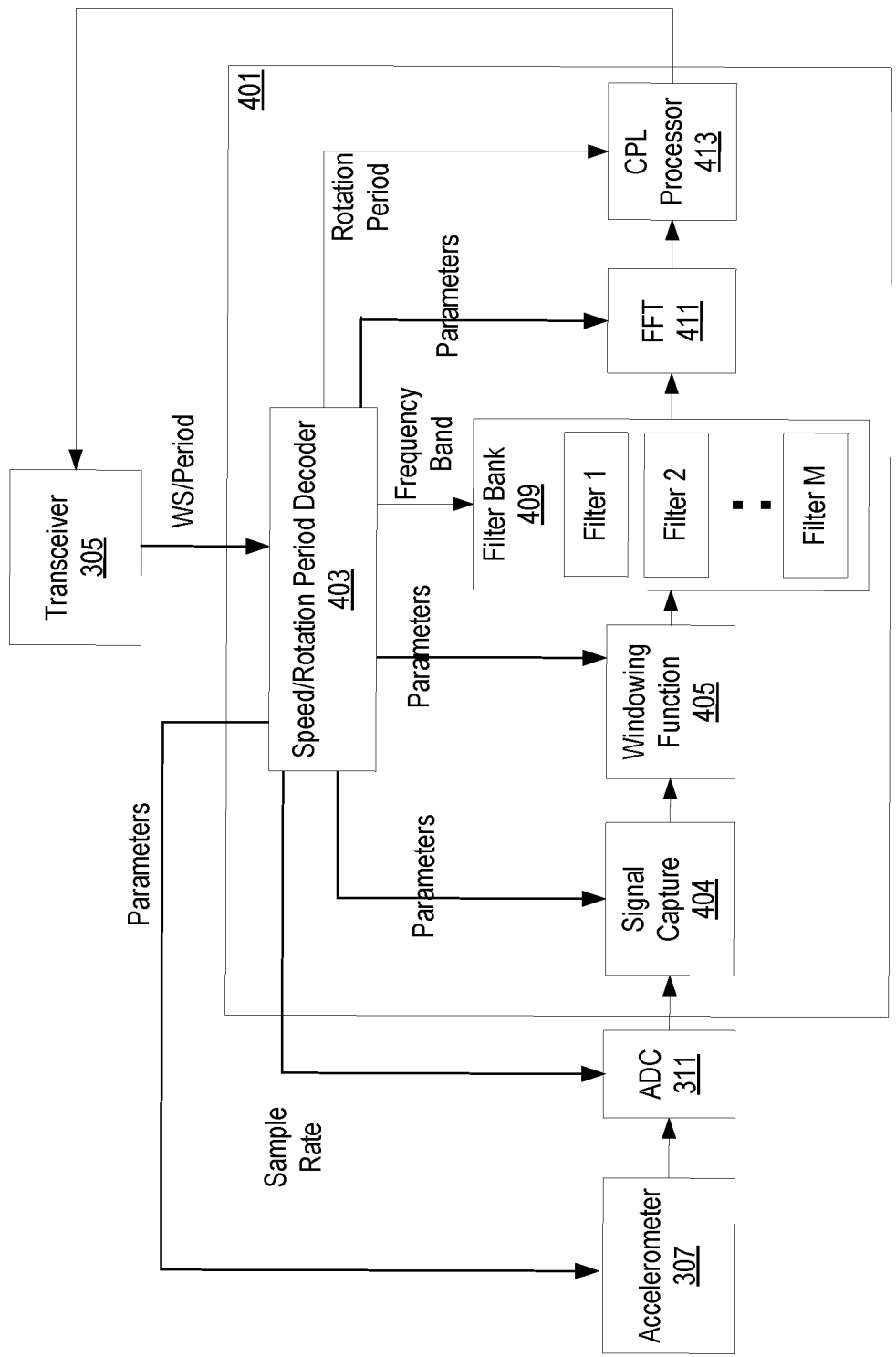
FIG. 11 shows a block diagram of a TMS data processing unit configured with a wheel speed parameter in accordance with the present disclosure.

The method of FIG. 10 is different from the method of FIG. 9 in that receiving (910), by the transceiver, one or more parameters from a vehicle control unit, includes receiving (1010) a wheel speed parameter or a rotational period parameter. The method of FIG. 10 further differs from the method of FIG. 9 in that configuring (920), in dependence upon the one or more parameters, the data processing unit may include configuring (1020) a sampling rate of the accelerometer in dependence upon the one or more parameters include, for example, the wheel speed. Referring also to FIG. 11, configuring (1020) a sampling rate of the accelerometer in dependence upon the one or more parameters, such as wheel speed, may be carried out by the speed/rotation period decoder (403) receiving the wheel speed or rotational period parameter via the transceiver (305), by the processor (401) accessing the memory (303) to determine a sampling rate corresponding to the wheel speed or rotational period from the sampling rates table (322), and by the processor (401) configuring the ADC (311) with the identified sampling rate. The ADC (322) is configured to receive electrical signals from the accelerometer (307) and sample the signals at the identified sampling rate to produce a raw accelerometric waveform profile.

The method of FIG. 10 further differs from the method of FIG. 9 in that configuring (920), in dependence upon the one or more parameters, the data processing unit may include configuring (1025) a configuring a signal capture and processing function in dependence upon the one or more parameters including, for example, wheel speed or rotational period. Referring also to FIG. 11, configuring (1025) a configuring a signal capture and processing function in dependence upon a parameter such as wheel speed or rotational period may be carried out by the speed/rotation period decoder (403) receiving the wheel speed parameter via the transceiver (305), by the processor (401) accessing the memory (303) to determine a signal capture and processing configuration parameter (321) corresponding to the wheel speed or rotational period, and by the processor (401) configuring the signal capture and processing (404) in accordance with the configuration parameters (327).

The method of FIG. 10 further differs from the method of FIG. 9 in that configuring (920), in dependence upon the one or more parameters, the data processing unit may include configuring (1030) a window size of a road strike waveform in dependence upon the one or more parameters include, for example, the wheel speed. Referring also to FIG. 11, configuring (1030) a window size of a road strike waveform in dependence upon the one or more parameters, such as wheel speed, may be carried out by the speed/rotation period decoder (403) receiving the wheel speed or rotational period parameter via the transceiver (305), by the processor (401) accessing the memory (303) to determine a windowing function (e.g., a Kaiser window) corresponding to the wheel speed or rotational period from the windowing function table (323), and by the processor (401) applying the identified windowing function (405) to an accelerometric waveform to isolate a tire strike event. For example, an accelerometric waveform corresponding to a high wheel speed and thus high sample rate requires a smaller window than an accelerometric waveform corresponding to a low wheel speed and thus low sample rate.

The method of FIG. 10 further differs from the method of FIG. 9 in that configuring (920), in dependence upon the one or more parameters, the data processing unit may include configuring (1040) a filter frequency band in dependence upon the one or more parameters include, for example, the wheel speed. Referring also to FIG. 11, configuring (1040) a filter frequency band in dependence upon the one or more parameters, such as wheel speed, may be carried out by the speed/rotation period decoder (403) receiving the wheel speed or rotational period parameter via the transceiver (305), by the processor (401) accessing the memory (303) to determine a filter frequency band corresponding to the wheel speed or rotational period from the filter table (323), and by the processor (401) configuring the filter bank (409) with the identified filter. For example, the Filters 1-M in the filter bank (409) may each correspond to a frequency band optimized for a specific wheel speed or rotational period. The filtering performed by filter bank (409) optimizes the accelerometric waveform by removing noise attributable to jitter at a particular speed. As another example, the one or more parameters may include a noise estimation parameter from a wheel speed sensor. The noise estimation parameter may be used to configure the filter bank (409) noise attributable to jitter at a particular speed.

The method of FIG. 10 further differs from the method of FIG. 9 in that configuring (920), in dependence upon the one or more parameters, the data processing unit may include configuring (1045) a configuring an FFT/Goertzel function in dependence upon the one or more parameters including, for example, wheel speed. Referring also to FIG. 11, configuring (1045) a configuring an FFT/Goertzel function in dependence upon a parameter such as wheel speed may be carried out by the speed/rotation period decoder (403) receiving the wheel speed or rotational period parameter via the transceiver (305), by the processor (401) accessing the memory (303) to determine a configuration parameter (327) for the FFT/Goertzel algorithm corresponding to the wheel speed or rotational period, and by the processor (401) configuring the FFT/Goertzel function (411) in accordance with the configuration parameters (327).

The method of FIG. 10 further differs from the method of FIG. 9 in that extracting (940), from the signals, by the data processing unit, the tire feature data includes calculating (1050) a contact patch length based on a rotational period of the tire. Referring also to FIG. 11, calculating (1050) a contact patch length based on a rotational period of the tire may be carried out by the speed/rotation period decoder (403) receiving the wheel speed or rotational period parameter via the transceiver (305) and providing the rotational period to the CPL processor (413), by the CPL processor (413) receiving a frequency domain accelerometric profile from the FFT (411), and by the CPL processor (413) calculating a contact patch length based on the rotational period, the circumference of the tire, and the time at which the accelerometric profile is at 0 g.

Figure 12:
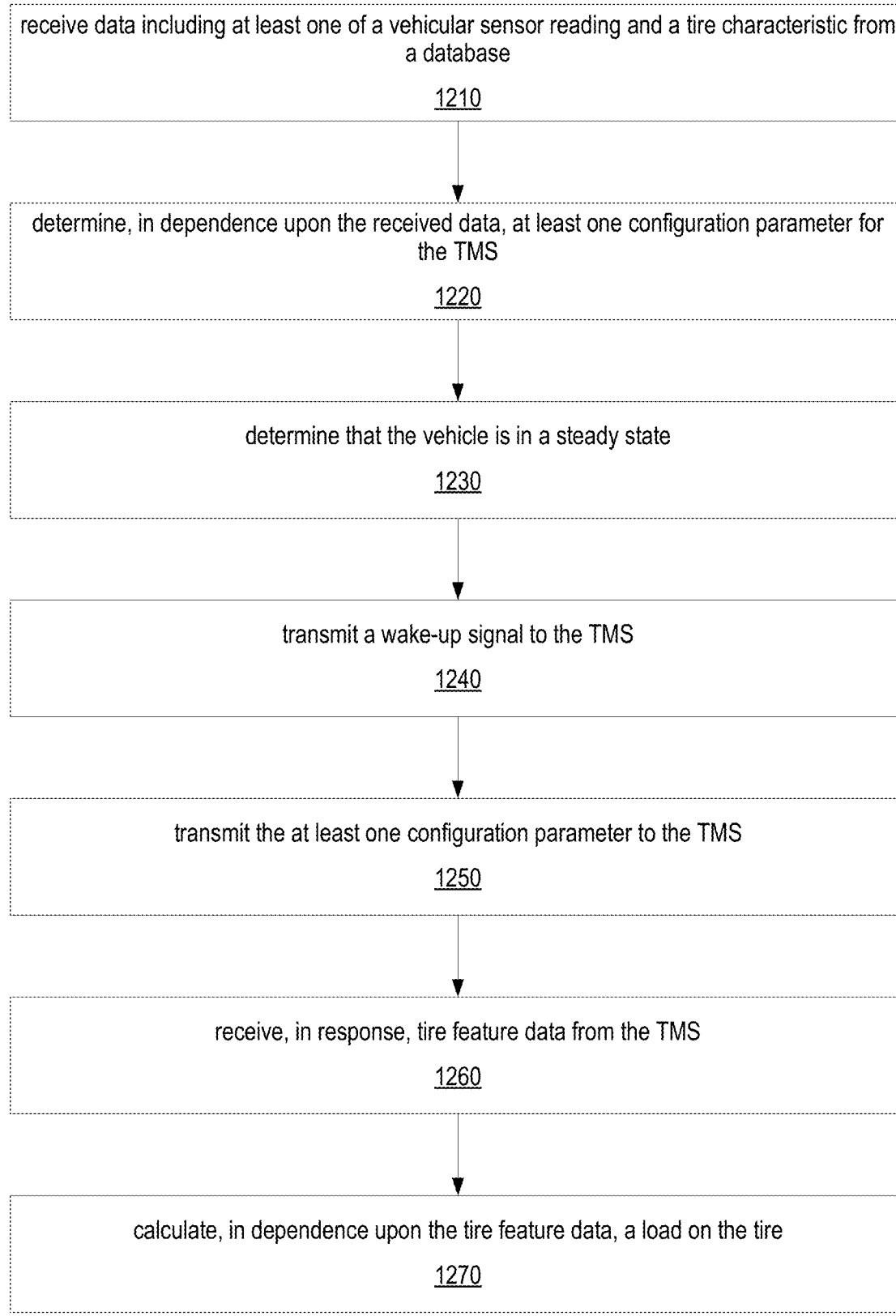
FIG. 12 is a flowchart to illustrate another implementation of a method for adaptively configuring a TMS with vehicle provided parameters in accordance with the present disclosure.

For further explanation, FIG. 12 sets forth a flow chart illustrating an exemplary method of a vehicle control unit for adaptively configuring a tire mounted sensor (TMS) using a vehicle-provided parameter that includes receiving (1210) data including at least one of a vehicular sensor reading and a tire characteristic from a database. Receiving (1210) data including at least one of a vehicular sensor reading and a tire characteristic from a database may be carried out by the control unit (201) receiving sensor readings from vehicle sensors such as wheel speed sensor (211), yaw rate sensor (213), and inclination sensor (215). Receiving (1210) data including at least one of a vehicular sensor reading and a tire characteristic from a database may also be carried out by the control unit (201) receiving tire specifications and/or tire characteristics from the database (125) via server (123) and cloud (121) (see FIG. 1). Tire specifications may include tire type (e.g., passenger), width, aspect ratio, diameter, circumference, treadwear grade, traction grade, temperature grade, maximum load limit, load index, inflation limits, optimal inflation pressure, and other specifications as will be recognized by those of skill in the art. Tire characteristics may include reference radial acceleration profiles, contact patch lengths, or peak radial displacements corresponding to various speeds, road terrains, tire pressures, tire temperatures, environmental temperatures, and weather conditions.

The exemplary method of FIG. 12 also includes determining (1220), in dependence upon the received data, at least one configuration parameter for the TMS. Determining (1220), in dependence upon the received data, at least one configuration parameter for the TMS may be carried out by the control unit (201) selecting a parameter with which to configure a component of the TMS, such as an accelerometer, an ADC, a windowing function, or a filter bank. For example, a configuration parameter may be a wheel speed parameter from a wheel speed sensor, a yaw rate parameter from a yaw rate sensor, an inclination parameter from an inclination sensor, or a radial offset parameter.

The exemplary method of FIG. 12 may also include determining (1230) that the vehicle is in a steady state. Determining (1230) that the vehicle is in a steady state may be carried out by the controller (201) determining that vehicle speed and acceleration are nearly constant, that the vehicle is not maneuvering a corner, and/or that the vehicle is not at an incline.

The exemplary method of FIG. 12 may also include transmitting (1240) a wake-up signal to the TMS. Transmitting (1240) a wake-up signal to the TMS may be carried out by the transceiver (205) transmitting a signal to the TMS (300) indicating that the TMS should begin processing accelerometric data.

The exemplary method of FIG. 12 also includes transmitting (1250) the at least one configuration parameter to the TMS. Transmitting (1250) the at least one configuration parameter to the TMS may be carried out by the transceiver (205) transmitting the parameter to the TMS (300). The configuration parameter may be transmitted, for example, by a device adapted for Bluetooth Low Energy specifications.

The exemplary method of FIG. 12 also includes receiving (1260), in response, tire feature data from the TMS. Receiving (1260), in response, tire feature data from the TMS may be carried out by the transceiver (205) receiving tire feature data such as a radial acceleration profile, peak radial displacement, and a contact patch length from the TMS (300).

The exemplary method of FIG. 12 may also include calculating (1270), in dependence upon the tire feature data, a load on the tire. Calculating (1270), in dependence upon the tire feature data, a load on the tire may be carried out by the controller (201) using calculations related to radial acceleration profiles, peak radial displacement, and a contact patch length.

In view of the explanations set forth above, readers will recognize that the benefits of adaptively configuring a tire mounted sensor with vehicle-provided parameters according to embodiments of the present disclosure include, but are not limited to:

the collection of TMS data is delayed until the vehicle is in a steady operational state and thus the collection of non-stabilized data is avoided;

the TMS is configured with operational conditions known to the vehicle ECU to inform data collection, thereby reducing the time required for feature measurement;

known operational conditions of the vehicle typically mean that fewer rotational strike periods are needed to extract the tire feature; and reduced operating time of the TMS due to improved measurements translates to reduced battery consumption.

Exemplary embodiments of the present invention are described largely in the context of a fully functional computer system for adaptively configuring a tire mounted sensor with a vehicle-provided parameter. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of adaptively configuring a tire mounted sensor (TMS) comprising an accelerometer, a data processing unit, and a transceiver, the method comprising:
    receiving, by the transceiver, one or more parameters from a vehicle control unit;
    configuring, in dependence upon the one or more parameters, the data processing unit including configuring a windowing function of a road strike waveform in dependence upon the one or more parameters;
    processing, by the configured data processing unit, signals from the accelerometer;
    extracting, from the signals, by the configured data processing unit, tire feature data; and
    transmitting, by the transceiver, the tire feature data to the vehicle control unit.

2. The method of claim 1, wherein the tire feature data includes at least one of a radial acceleration profile, peak radial displacement, and a contact patch.

3. The method of claim 1, wherein receiving, by the transceiver, one or more parameters from a vehicle control unit includes receiving a wheel speed.

4. The method of claim 1, wherein configuring, in dependence upon the one or more parameters, the data processing unit includes configuring an accelerometer range, an accelerometer gain, and a sampling rate of the accelerometer in dependence upon the one or more parameters.

5. The method of claim 1, wherein configuring, in dependence upon the one or more parameters, the data processing unit includes configuring at least one of a filter frequency band, a Fast Fourier Transform (FFT) function, and a Goertzel function in dependence upon the one or more parameters.

6. The method of claim 1, wherein extracting, from the signals, by the data processing unit, the tire feature data includes calculating a contact patch length based on a rotational period of the tire.

7. The method of claim 1, processing, by the data processing unit, signals from the accelerometer includes isolating a road strike waveform by applying a windowing function.

8. The method of claim 1, wherein receiving, by the transceiver, one or more parameters from a vehicle control unit includes receiving at least one of wheel speed, radial force offset, yaw rate, vehicle inclination, and wiper activity.

9. The method of claim 1, wherein the transceiver is a Bluetooth Low Energy transceiver.

10. A method of a vehicle control unit adaptively configuring a tire mounted sensor (TMS) via a transceiver, the method comprising:
receiving data including at least one of a vehicular sensor reading and a tire characteristic from a database;
determining, in dependence upon the received data, at least one configuration parameter for the TMS;
prior to transmitting the at least one configuration parameter to the TMS, determining that the vehicle is in a steady state;
transmitting a wake-up signal to the TMS;
transmitting the at least one configuration parameter to the TMS; and
in response to transmitting the at least one configuration parameter, receiving tire feature data from the TMS.

11. The method of claim 10, further comprising calculating, in dependence upon the tire feature data, a load on the tire.

12. The method of claim 10, wherein receiving data including at least one of a vehicular sensor reading and a tire characteristic from a database includes receiving a wheel speed sensor reading from a wheel speed sensor; and
wherein determining, in dependence upon the received data, at least one configuration parameter for the TMS includes determining at least one of a wheel speed and a rotational period of the tire.

13. The method of claim 10, wherein receiving data including at least one of a vehicular sensor reading and a tire characteristic from a database includes receiving a tire characteristic from a cloud database.

14. The method of claim 10, wherein the at least one configuration parameter includes at least one of wheel speed, radial force offset, yaw rate, and vehicle inclination.

15. The method of claim 10, the tire feature data is at least one of a radial acceleration profile, peak radial displacement, and a contact patch length.

16. The method of claim 10, wherein the transceiver is a Bluetooth Low Energy transceiver.

17. A tire mounted sensor (TMS) comprising:
an accelerometric device responsive to radial acceleration forces of a tire;
a data processing unit configurable by at least one parameter supplied by a vehicle control unit, such that at least one of a filter frequency band, a Fast Fourier Transform (FFT) function, and a Goertzel function is configured in dependence upon the at least one parameter, wherein the data processing unit processes signals from the accelerometer and extracts, from the signals, tire feature data; and
a transceiver configured to receive the at least one parameter from the vehicle control unit and transmit, to the vehicle control unit, the extracted tire feature data.

18. A vehicle control unit (VCU) for adaptively configuring a tire mounted sensor (TMS) using a vehicle-provided parameter, the VCU comprising:
a controller configured to:
receive data including at least one of a vehicular sensor reading and a tire characteristic from a databases;
determine, in dependence upon the received data, at least one configuration parameter for the TMS; and
prior to transmitting the at least one configuration parameter to the TMS, determining that the vehicle is in a steady state; and
a transceiver configured to:
transmit a wake-up signal to the TMS;
transmit the at least one configuration parameter to the TMS; and
receive tire feature data from the TMS.

* * * * *